United States Patent
Ranns et al.

(10) Patent No.: US 9,781,029 B2
(45) Date of Patent: Oct. 3, 2017

(54) LOOP DETECTION AND PREVENTION

(71) Applicant: Cisco Technology, Inc., San Jose, CA (US)

(72) Inventors: Neale D. R. Ranns, Basingstoke (GB); Ijsbrand Wijnands, Leuven (BE); Gregory J. Shepherd, Eugene, OR (US)

(73) Assignee: Cisco Technology, Inc., San Jose, CA (US)

( * ) Notice: Subject to any disclaimer, the term of this patent is extended or adjusted under 35 U.S.C. 154(b) by 76 days.

(21) Appl. No.: 15/015,463

(22) Filed: Feb. 4, 2016

(65) Prior Publication Data

US 2017/0230277 A1    Aug. 10, 2017

(51) Int. Cl.
*H04L 12/28* (2006.01)
*H04L 12/705* (2013.01)
*H04L 12/18* (2006.01)

(52) U.S. Cl.
CPC .......... *H04L 45/18* (2013.01); *H04L 12/1863* (2013.01)

(58) Field of Classification Search
CPC ............................ H04L 45/18; H04L 12/1863
See application file for complete search history.

(56) References Cited

U.S. PATENT DOCUMENTS

| | | | |
|---|---|---|---|
| 7,826,348 B2 | 11/2010 | Farinacci et al. | 370/228 |
| 7,969,898 B1* | 6/2011 | Raj | H04L 12/462 370/242 |
| 8,589,573 B2* | 11/2013 | Mirtorabi | H04L 45/02 709/220 |
| 2006/0018333 A1* | 1/2006 | Windisch | H04L 12/1877 370/432 |
| 2006/0031490 A1 | 2/2006 | Provine | 709/225 |
| 2007/0174483 A1 | 7/2007 | Raj | 709/239 |
| 2012/0201124 A1 | 8/2012 | Marques et al. | 370/221 |
| 2012/0219004 A1 | 8/2012 | Balus | 370/395.53 |
| 2013/0089100 A1 | 4/2013 | Zhao | 370/393.5 |
| 2015/0078378 A1* | 3/2015 | Wijnands | H04L 12/1886 370/390 |

(Continued)

FOREIGN PATENT DOCUMENTS

| | | | |
|---|---|---|---|
| CN | 101669105 | 8/2012 | |
| EP | 2 140 363 | 11/2011 | |
| WO | WO 2008/134292 | 11/2008 | G06F 15/16 |

OTHER PUBLICATIONS

Deering, Stephen E., et al., Stanford University, "Multicast Routing in Datagram Internetworks and Extended LANS," pp. 85-110.

(Continued)

*Primary Examiner* — Afshawn Towfighi
(74) *Attorney, Agent, or Firm* — Campbell Stephenson LLP

(57) ABSTRACT

Various systems and methods for preventing loops. For example, one method involves receiving a multicast data packet at a node. The node is coupled to a local area network (LAN). An internet protocol (IP) prefix is assigned to the LAN. The method involves determining whether a source address included in the packet is covered by the IP prefix. Depending on the direction of travel of the multicast data packet and whether or not the source address is covered by the IP prefix, the node determines whether a loop exists.

20 Claims, 11 Drawing Sheets

(56) References Cited

U.S. PATENT DOCUMENTS

| | | | |
|---|---|---|---|
| 2015/0256405 A1 | 9/2015 | Janardhanan | 370/255 |
| 2016/0119156 A1 | 4/2016 | Drake | 709/223 |
| 2016/0134518 A1 | 5/2016 | Callon | 370/390 |
| 2016/0134525 A1 | 5/2016 | Zhang | 370/392 |
| 2016/0277210 A1 | 9/2016 | Lin | |
| 2017/0063600 A1 | 3/2017 | Singh | |

OTHER PUBLICATIONS

Karan, A., et al., Cisco Systems, Inc., "Multicast Only Fast Re-Route," draft-ietf-rtgwg-mofrr-08, May 18, 2015, pp. 1-14.

Mohanty, S., et al., Cisco Systems, Inc., "A New Designated Forwarder Election for the EVPN," draft-mohanty-bess-evpn-df-election-00, Mar. 7, 2015, pp. 1-11.

Bashandy, Ed. A., et al., Cisco Systems, Inc., "BGP Prefix Independent Convergence," draft-rtgwg-bgp-pic-02,txt, Oct. 21, 2013, pp. 1-20.

Li, T., et al., Juniper Networks, "Cisco Hot Standby Router Protocol (HSRP)," Network Working Group, Request for Comments 2281, Mar. 1998, pp. 1-17.

Moy, J., Ascend Communications, Inc., "OSPF Version 2," Network Working Group, Request for Comments 2328, Apr. 1998, pp. 1-244.

Handley, M., et al., UCL, "Bidirectional Protocol Independent Multicast (BIRDIR-PIM)," Network Working Group, Request for Comments 5015, Oct. 2007, pp. 1-43.

Filsfils, Ed. C., et al., Cisco Systems, Inc., "Loop-Free Alternate (LFA) Applicability in Service Provider (SP) Networks," Internet Engineering Task Force (IETF), Request for Comments 6571, Jun. 2012, pp. 1-35.

Sajassi, Ed. A., et al., Cisco Systems, Inc., "BGP MPLS-Based Ethernet VPN," Internet Engineering Task Force (IETF), Request for Comments 7432, Feb. 2015, pp. 1-56.

Bryant, S., et al., Cisco Systems, Inc., "Remote Loop-Free Alternate (LFA) Fast Reroute (FRR)," Internet Engineering Task Force (IETF), Request for Comments 7490, Apr. 2015, pp. 1-29.

Holbrook, Hugh W., et al., Department of Computer Science, Stanford University, "IP Multicast Channels: Express Support for Large-Scale Single-Source Applications," SIGCOMM, 1999, pp. 65-78.

Breitgand, David, et al., "Hierarchical Reactive Monitoring of Multicast Membership Size," pp. 1-15.

"Configuring IPv4 Multicast Layer 3 Switching", Cisco IOS Software Configuration Guide, Release 12.2SX, Chapter 37, pp. 1-30.

"Configuring Bidirectional PIM," Cisco IOS IP Configuration Guide, Release 12.2, pp. 1-6.

* cited by examiner

LOOP DETECTION AND PREVENTION

BACKGROUND OF THE INVENTION

Network nodes forward data. Network nodes may take form in one or more routers, one or more bridges, one or more switches, one or more servers, or any other suitable communications processing device. The data is commonly formatted as packets and forwarded using forwarding tables. A packet is a formatted unit of data that typically contains control information and payload data. Control information may include: information that identifies sources and destinations, such as addresses, error detection codes like checksums, sequencing information, etc. Control information is typically found in packet headers and trailers. Payload data is typically located between the packet headers and trailers.

Forwarding packets involves various processes that, while simple in concept, can be complex. The processes involved in forwarding packets vary, depending on the type of forwarding method used. In some networks, the potential exists for packet looping and delivery of duplicate copies of packets to receivers. Packet looping and the unnecessary delivery of duplicate copies of packets represent unwelcome burdens on network resources and can lead to degradation of network performance

BRIEF DESCRIPTION OF THE DRAWINGS

The present disclosure may be better understood, and its numerous objects, features, and advantages made apparent to those skilled in the art by referencing the accompanying drawings.

DETAILED DESCRIPTION

Overview

Figure 1A:
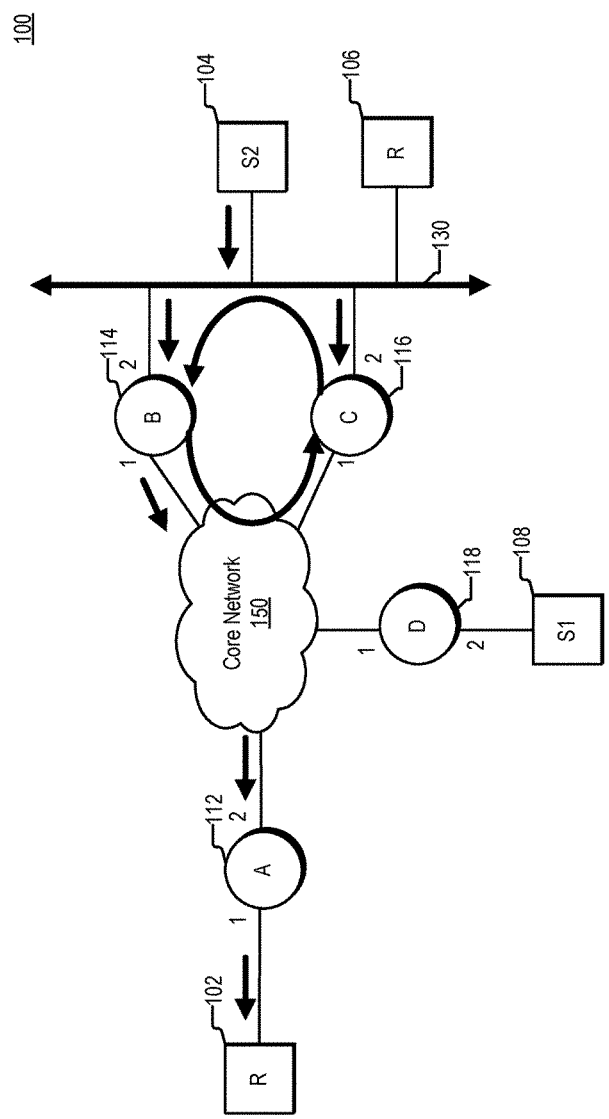
FIG. 1A is a simplified block diagram illustrating certain components of an example network.

Various systems and methods for preventing loops. For example, one method involves receiving a multicast data packet at a node. The node is coupled to a local area network (LAN). An internet protocol (IP) prefix is assigned to the LAN. The method involves determining whether a source address included in the packet is covered by the IP prefix. Depending on the direction of travel of the multicast data packet and whether or not the source address is covered by the IP prefix, the node determines whether a loop exists.

In the context of packet forwarding, a routing loop refers to the situation in which a node forwards a packet towards some destination, or receiver, and subsequently the node receives the packet, or a copy of the packet, again. Routing loops can form in multiple ways. For example, a routing loop can be formed due to routing information being stale or otherwise inaccurate, e.g., routing information failing to reflecting topology changes. The formation of routing loops is of particular concern in multicast networks (which are networks that implement multicast forwarding) because in multicast networks, multiple nodes often duplicate and forward multicast data packets. This increases the number of situations in which loops can occur, as compared to unicast routing, in which a single source typically transmits packets addressed to unique destinations along a single path to the respective destinations. Therefore, loop prevention takes on added importance, and can be more complex, in multicast networks. As described below, multicast protocols generally provide rules to detect and/or prevent loops. However, in certain scenarios, these rules are ineffective.

Multicast

Multicast delivers multicast data packets (data packets that traditionally include destination address information that identifies a multicast group, such as a multicast group address, also referred to herein simply as packets) from a source to multiple receivers without unduly burdening the source. As used herein, the term "receiver" signifies a host (such as a computing device or application) that has subscribed to a multicast group. Instead of the source replicating a multicast data packet and sending a copy of the multicast data packet to each receiver, the source sends a single copy of a multicast data packet into a multicast network. A multicast network is a network that includes multicast-enabled routers (referred to herein as multicast-enabled nodes or simply as nodes). The multicast-enabled nodes replicate the packet at the point(s) where paths to various receivers diverge. Multicast routing protocols enable multicast transmission (i.e., one-to-many connections and many-to-many connections) by replicating a multicast data packet close to the destination of that multicast data packet, thus avoiding the use of multiple unicast connections for the same purpose. This saves network bandwidth and improves throughput.

In many multicast networks, multicast data packets generally are forwarded away from a source towards the receivers. This direction of travel is referred to herein as downstream. One way a node in these multicast networks can prevent some routing loops from occurring is by verifying that a received multicast data packet is received via an interface through which the source of the multicast data packet is reachable via a shortest path to that source. That is, if a multicast data packet from a given source is received via any interface other than the interface associated with the shortest path to the source of the multicast data packet, the node drops the multicast data packet. This is known as reverse path forwarding (RPF). To implement this, a node that receives a multicast data packet can examine the multicast data packet to determine the IP address of the source (the source address) of the multicast data packet. The source address is typically included in a header of the multicast data packet. The node examines its routing information to determine the interface associated with the shortest path to the source (the RPF interface). If the multicast data packet was not received via the RPF interface, the packet is considered to have failed an RPF check and the node typically drops the packet.

In certain types of multicast, e.g., protocol independent multicast sparse mode (PIM-SM) and bidirectional PIM (BIDIR-PIM), multiple sources can transmit multicast data packets to a multicast group, and shared trees are used. Shared trees are routed at nodes known as rendezvous points (RPs). RPF checks in multicast networks using RPs are performed using the RP's address. That is, instead of a node checking whether a multicast data packet was received via an interface coupled to the shortest path to the source of the multicast data packet (using the source's IP address, as discussed above), the node checks whether the multicast data packet was received via an interface associated with the RP's address. In these scenarios the source's IP address is not typically used for RPF checks.

One type of multicast is known as bit index explicit replication (BIER). BIER is also referred to as stateless multicast because core nodes in a network implementing BIER can forward multicast data packets without the need for much of the state information used by other types of multicast. Instead, multicast data packets are forwarded based on information in a bitstring included in a header attached to the multicast data packet. Properties of BIER prevent introduction of routing loops and make it possible to eliminate performing RPF checks in many cases. However, routing loops can still occur in certain scenarios.

Designated Forwarders

Routing loops can be prevented in some scenarios by using RPF checks. Additional protection against routing loops is afforded by the use of designated routers (DRs) and designated forwarders (DFs). In certain network environments that include redundant nodes, e.g., multiple multicast-enabled nodes, the nodes designate one of the nodes to forward packets. Those nodes not so designated are prevented from forwarding packets. Doing so prevents transmission of duplicate copies of packets to receivers, and can also prevent packets from looping. For example, if two nodes are both coupled to a LAN, and are both configured to forward packets for a particular destination, e.g., receiver or receivers that have joined a particular multicast group, the two nodes can agree that only one of the nodes should forward packets associated with the multicast group onto the LAN. The process by which the two nodes agree on which of the two nodes will forward packets onto the LAN is known as a designated forwarder election. The elected node is known as a designated forwarder (DF). The DF forwards traffic destined for the receiver (e.g., packets addressed to the multicast group (or from the source)) to which the receiver has subscribed. Nodes that are not elected DF do not forward traffic to the receiver. For example, a non-DF node that receives multicast traffic that it would otherwise forward to the receiver, e.g., traffic that includes packets associated with a group the receiver has joined, drops the packets instead of forwarding them.

Pains are taken to ensure that DF election is robust. If multiple nodes think that they are the DF, loops can occur. One way to handle this is that forwarding packets can be suspended during periods in which an error has occurred that results in multiple routers believing they are the DF, or when there is suspicion of such an error. However, suspending forwarding is undesirable as it results in an interruption of data.

Loop Prevention

FIG. 1A is a simplified block diagram of network 100 in which techniques to detect and prevent routing loops can be implemented. Network 100 includes nodes 112, 114, 116, and 118, which are coupled to one another via core network 150 and also to source 104, source 108, receiver 102, and receiver 106. As shown in FIG. 1A, packets are sent from source 104 onto LAN 130, where the packets are received by node 114 and node 116. Node 114 has participated in a DF election and believes itself to be the designated forwarder. Consequently, node 114 packets received from LAN 130 into core network 150, where core nodes in core network 150 replicate and forward the packets such that copies of the packets are forwarded to receivers who have expressed interest in the packets. In the example of FIG. 1A, receiver 102 has expressed interest in (joined) the multicast group with which the packets are associated, and the packets are forwarded to node 112, and from there to receiver 102.

In network 100, and other network environments that include multiple nodes forwarding packets to one or more receivers, routing loops can occur. Consider an example in which node 114 forwards a packet from LAN 130 to core network 150. The packet is replicated and forwarded towards one or more receivers. If the nodes in core network 150 forward the packet to node 116, and node 116 forwards the packet onto the LAN, node 114 again receives the packet from LAN 130 and a loop occurs, as shown by the curved arrows in FIG. 1A. In some embodiments, this loop can be prevented by designating only one of node 114 or node 116 to forward packets received from LAN 130. For example, node 114 can be configured to forward the packets received from LAN 130 while node 116 can be configured to drop the packets. However, if both node 114 and node 116 are configured to forward packets, routing loops can occur. Such routing loops can lead to situations, e.g., packet storms, in which performance of the network and network components is degraded, sometimes severely.

In one embodiment, network 100 is configured to perform multicast data transmission. Nodes 112, 114, 116, and 118 are, in one embodiment, multicast-enabled nodes. These nodes can implement one or more traditional multicast protocols, such as bidirectional protocol independent multicast (bidir-PIM), sparse mode, source specific mode, or the like, or can implement BIER. Multicast-enabled nodes 112-118 are coupled to each other through core network 150 which, in one embodiment, includes a multicast network, or a network that includes a number of multicast-enabled nodes.

Nodes 112-118 are configured as edge nodes, such as provider edge nodes. Each of the nodes 112-118 has interfaces that are identified as shown. For example, node 114 has two interfaces designated 1 and 2, respectively. Information identifying these interfaces is used in forwarding information, such as forwarding tables, to determine where a packet should be forwarded. Node 112 is coupled to receiver 102, and node 118 is coupled to source 108. Such coupling can be direct (e.g., via a wire, fiber optic cable, wireless connection, or some other communications medium) or indirect (e.g., via a L2 network device or another node, such as a customer edge (CE) node). Nodes 114 and 116 are shown as being coupled to source 104 and receiver 106 via local area network (LAN) 130. The coupling between nodes 114 and 116 and source 104 and receiver 106 can be direct (e.g., via a wire, fiber optic cable, wireless connection, or some other communications medium) or indirect (e.g., via a L2 network device or another node, such as a customer edge (CE) node).

Source 104 and source 108 each represent a host configured to transmit packets, e.g., multicast data packets, to one or more receivers, e.g., subscribers to one or more multicast groups. Sources 104 and 108 are each configured to transmit one or more multicast flows, where each multicast flow consists of one or more multicast data packets having a common multicast group address. The sources transmit the multicast flows to the closest node to which they are connected, e.g., node 118 in the case of source 108. Node 118 (and other multicast-enabled edge nodes) includes forwarding information, such as a multicast forwarding table, that node 118 uses to determine where, e.g., out of which interface(s) to forward the multicast data packets associated with the multicast flow. For example, node 118 can determine that both node 114 and node 116 have sent join requests for a particular multicast group. Using forwarding information, such as a multicast forwarding table, node 112 determines that both node 114 and 116 are reachable via interface 1. In response to receiving, e.g., from source 108, multicast data packets addressed to the particular multicast group, node 118 forwards the multicast data packets out of interface 1.

Receiver 106 is configured to receive multicast data packets after joining one or more multicast groups. For example, receiver 106 can transmit join information, such as an IGMP report or MLD report, that identifies a multicast group to which receiver 106 wishes to subscribe. In the example of FIG. 1, receiver 106 transmits the join information onto LAN 130. In one embodiment, LAN 130 and the devices connected thereto form a leaf network, and LAN 130 is known as a terminal LAN. A terminal LAN is a LAN that is at the edge of the network, meaning no additional downstream nodes are coupled to the LAN, though a number of hosts can be connected to the LAN. LAN 130 is assigned an IP prefix, and each host coupled the LAN is assigned an IP address that is covered by the IP prefix. Leaf networks couple provider equipment to customer equipment, unlike transit networks, which couple provider equipment to other provider equipment. When LAN 130 is a terminal LAN, nodes 114 and 116 can expect that all packets received from LAN 130 have source IP addresses corresponding to LAN 130.

Nodes 114 and 116 receive the join information from receiver 106 and inform node 118 that they are coupled to one or more receivers that wish to subscribe to a multicast group associated with a source to which node 118 is coupled by forwarding the join information towards node 118 using, for example, protocol independent multicast (PIM) join messages. In response to receiving the join messages, node 118 updates its multicast forwarding information to identify interfaces to which multicast data packets should be forwarded in order to reach receiver 106. The multicast data packets can be replicated by node 118 and/or by nodes in core network 150 as needed in order to provide the multicast data packets to receivers for the multicast group (e.g., receiver 106). In this manner, a multicast flow from source 108 can be transmitted through a multicast network to one or more receivers.

Nodes can discover redundancy and designate a primary forwarder, such as a DR or DF. Doing so helps to prevent delivery of redundant packets to receivers. Redundancy can include, for example, multiple nodes in a single leaf network, multiple nodes coupled to a single LAN segment, multiple nodes coupled to a single RP, or any other configuration that would result, if not ameliorated, in duplicate copies of packets being delivered to one or more receivers.

Detection of redundancy can be performed in various ways. For example, in networks that implement PIM, nodes exchange state information with their neighbors. The state information is included in PIM-Hello messages. The information in the PIM-Hello messages is used by the nodes to discover redundancy. Nodes can also, or in the alternative, use information in Interior Gateway Protocol (IGP) messages (such as IS-IS (Intermediate System to Intermediate System) and OSPF (Open Shortest Path First)) and/or information in Border Gateway Protocol (BGP) messages to detect redundant nodes. Detecting redundancy involves detecting how many connections to a particular network entity, such as a LAN, exist and also, in some cases, which nodes are connected to the particular network entity.

In response to detecting redundant nodes, the nodes select one of the redundant nodes to forward information, such as multicast data packets and/or control information, on behalf of the redundant nodes. Those nodes not elected rely on the elected node to perform the forwarding tasks. In one embodiment, the nodes elect a DF. Election of a DF can be based on, for example, router priority, router identifier, IP address, shortest distance to a rendezvous point (RP), or some combination of these and/or other factors. In the example of FIG. 1, node 114 and node 116 exchange PIM-Hello messages. Based upon information in the PIM-Hello messages, node 114 is elected DF.

As shown in FIG. 1A, both node 114 and node 116 receive traffic (e.g., multicast data packets transmitted by source 104) from LAN 130. Both node 114 and node 116 would forward the received traffic into core network 150, resulting in duplicate packets being received by receiver 102, and formation of a routing loop. For example, if node 114 forwards a packet received from LAN 130 to core network 150, the packet is replicated and forwarded towards one or more receivers, such as receiver 102. If the nodes in core network 150 forward the packet to node 116, and node 116 forwards the packet onto the LAN, node 114 again receives the packet from LAN 130 and a loop occurs, as shown by the curved arrows in FIG. 1A. However, since node 116 is not configured as the DF, node 116 does not forward the traffic into core network 150. Instead, node 116 drops the traffic. That is, forwarding information on node 116 is configured such that traffic received on an interface coupled to LAN 130 (interface 2 in this example) by node 116 is dropped. Similarly, node 116 is configured to drop packets received on an interface coupled to core network 150 (interface 1 in this example).

Figure 1B:
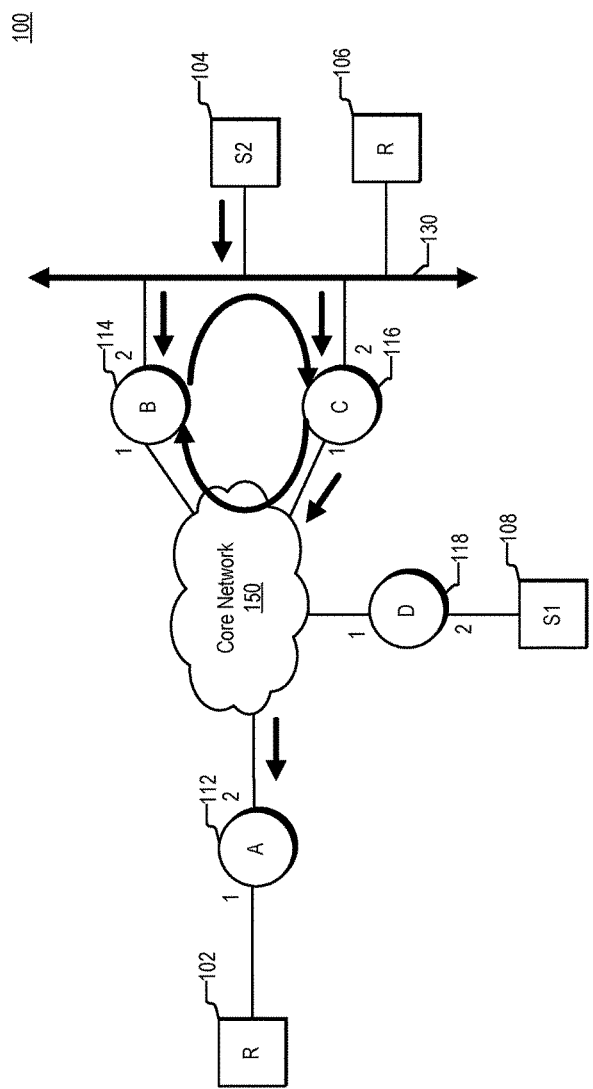
FIG. 1B is a simplified block diagram illustrating certain components of an example network.

FIG. 1B is a simplified block diagram of network 100, in which techniques to detect and prevent routing loops can be implemented. Like numbered elements of FIG. 1B correspond to those of FIG. 1A. In the example of FIG. 1B, node 116 is configured as a DF. Both node 114 and node 116 receive traffic (e.g., multicast data packets addressed to a group that receiver 106 has joined) from core network 150. Both node 114 and node 116 would forward the received traffic onto LAN 130, resulting in duplicate packets being received by receiver 102 and formation of a routing loop. For example, if node 116 forwards a packet received from LAN 130 to core network 150, the packet is replicated and forwarded towards one or more receivers, such as receiver 102. If the nodes in core network 150 forward the packet to node 114, and node 114 forwards the packet onto the LAN, node 116 again receives the packet from LAN 130 and a loop occurs, as shown by the curved arrows in FIG. 1B. However, since node 114 is not configured as the DF, node 116 forward the traffic onto LAN 130 and node 114 drops the traffic. That is, forwarding information on node 114 is configured such that traffic received on an interface coupled to LAN 130 (interface 2 in this example) by node 114 is dropped. Similarly, node 114 is configured to drop packets received on an interface coupled to core network 150 (interface 1 in this example).

The election of a designated forwarder can prevent loops in some situations. However, the election process is not perfect, and errors in the election process can lead to multiple nodes concurrently acting as designated forwarder, which can, as discussed above, lead to routing loops.

While the current description primarily refers to multicast protocols and multicast data packets, it is noted that the concepts described herein are applicable to network protocols and traffic other than multicast. Where terms such as multicast-enabled nodes are used, it is understood that in certain embodiments, the nodes need not implement multicast. For example, a node as described herein may be a node configured to implement Ethernet Virtual Private Networking (EVPN) in addition to or instead of multicast and the multicast data packets may be simply data packets, e.g., packets that do not include multicast information. The present description is applicable to any type of multi-destination traffic, such as broadcast traffic, unknown unicast traffic, and multicast traffic.

Figure 2:
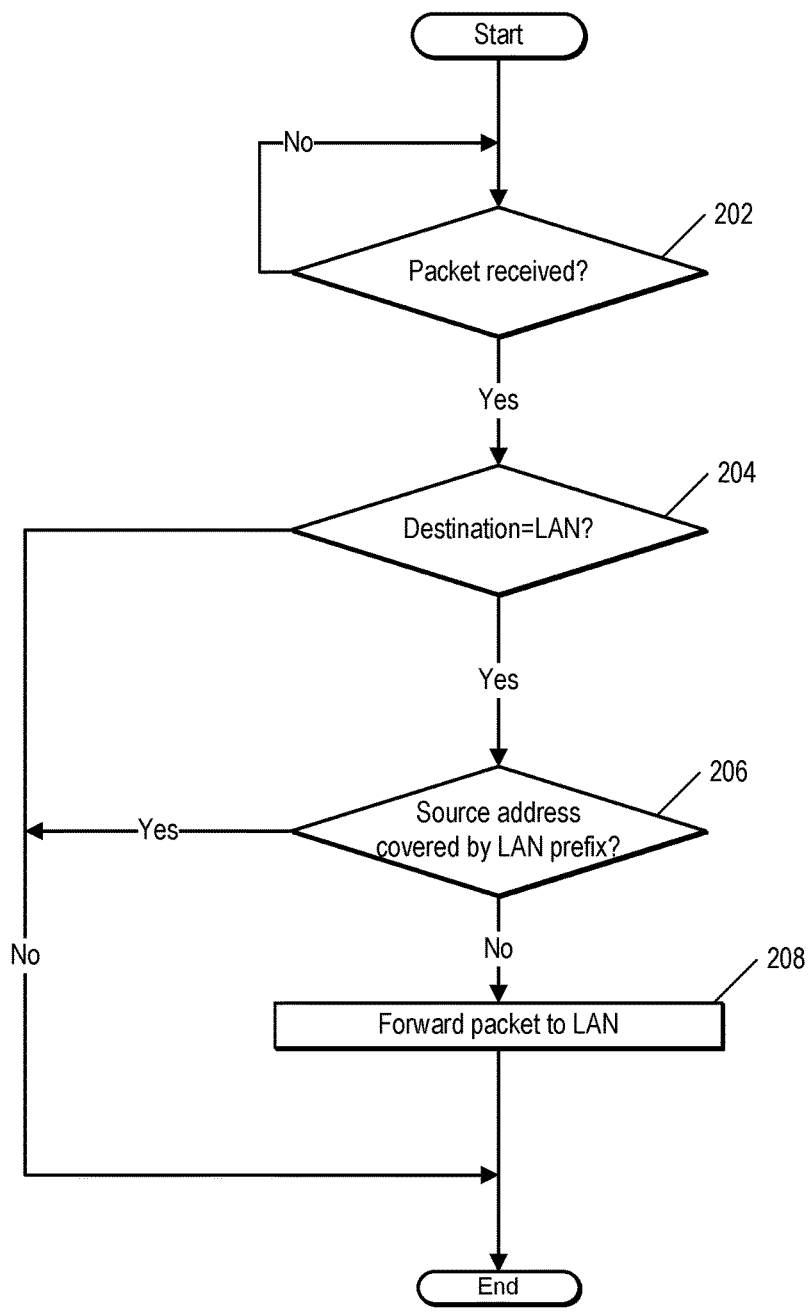
FIG. 2 is a flow chart illustrating an example process, according to the present description.

FIG. 2 shows an example method of detecting and preventing routing loops. In one embodiment, the method of FIG. 2 is performed by one or more nodes in a leaf network, such as nodes 114 and 116 of FIG. 1A, that are coupled to a terminal LAN, such as LAN 130 of FIG. 1A. The method shown in FIG. 2 can prevent routing loops of traffic being forwarded away from the LAN and towards one or more receivers, e.g., via a core network such as core network 150 of FIG. 1A. Such routing loops can result from multiple nodes concurrently acting as designated forwarder, e.g., due to an error with the designated forwarder election process. To prevent these loops, the node prevents packets from being improperly forwarded onto the LAN, which could lead to a loop of traffic being forwarded into the core network. Thus, though the method described with regard to FIG. 2 prevents loops relating to traffic traveling in the ingress direction (into the core network, away from the LAN), traffic travelling in the egress direction (towards the LAN, away from the core network) is checked.

At 202, the node detects whether a packet has been received. If not, the node waits. In one embodiment, receiving a packet involves de-encapsulating the packet, or removing one or more headers, such as a BIER header, from the packet. In response to detecting that a packet is received, the node determines, at 204, the direction of travel of the packet. That is, the node determines whether the packet should be forwarded to the LAN. This determination is based on forwarding information maintained by the node and involves, in one embodiment, comparing a destination address included in the packet header, such as a multicast group address or IP address, with an interface list in a forwarding table. For example, if the packet includes a multicast group address of G1, and the node determines that one or more receivers that have subscribed to G1 are coupled to, or reachable via, the LAN, the node determines that the packet should be forwarded to the LAN. In one embodiment, the node can determine that the packet should be forwarded to the LAN based on the interface from which the packet was received. For example, the node can determine that all packets received via an interface coupled to the core network should be forwarded to the LAN.

Each host on the LAN is assigned an IP address. The IP address includes a routing prefix, or subnet mask. The prefix usually consists of some number of the most significant bits of the IP address. The IP address of each of the hosts on the LAN begins with the prefix assigned to the LAN. The node determines, at 206, whether a source address included in the packet is more specific than a prefix associated with the LAN. That is, the node determines whether the LAN's prefix "covers" the source address of the packet, and only forwards the packet onto the LAN, at 208, in response to determining that the source address is not covered by the LAN's prefix. To make this determination, the node compares the LAN's prefix with the corresponding bits in the source address of the packet. If all bits match, the source address of the packet is covered by LAN's prefix. This indicates that the packet was transmitted by a source coupled to the LAN, and forwarding the packet back onto the LAN would represent a loop. If the source address in the packet is covered by the LAN's prefix, the node does not forward the packet onto the LAN. Instead, the node drops the packet. Optionally, the node can generate error information. For example, the node can update a flag or a value in a register to indicate that a looped packet was received.

Figure 3A:
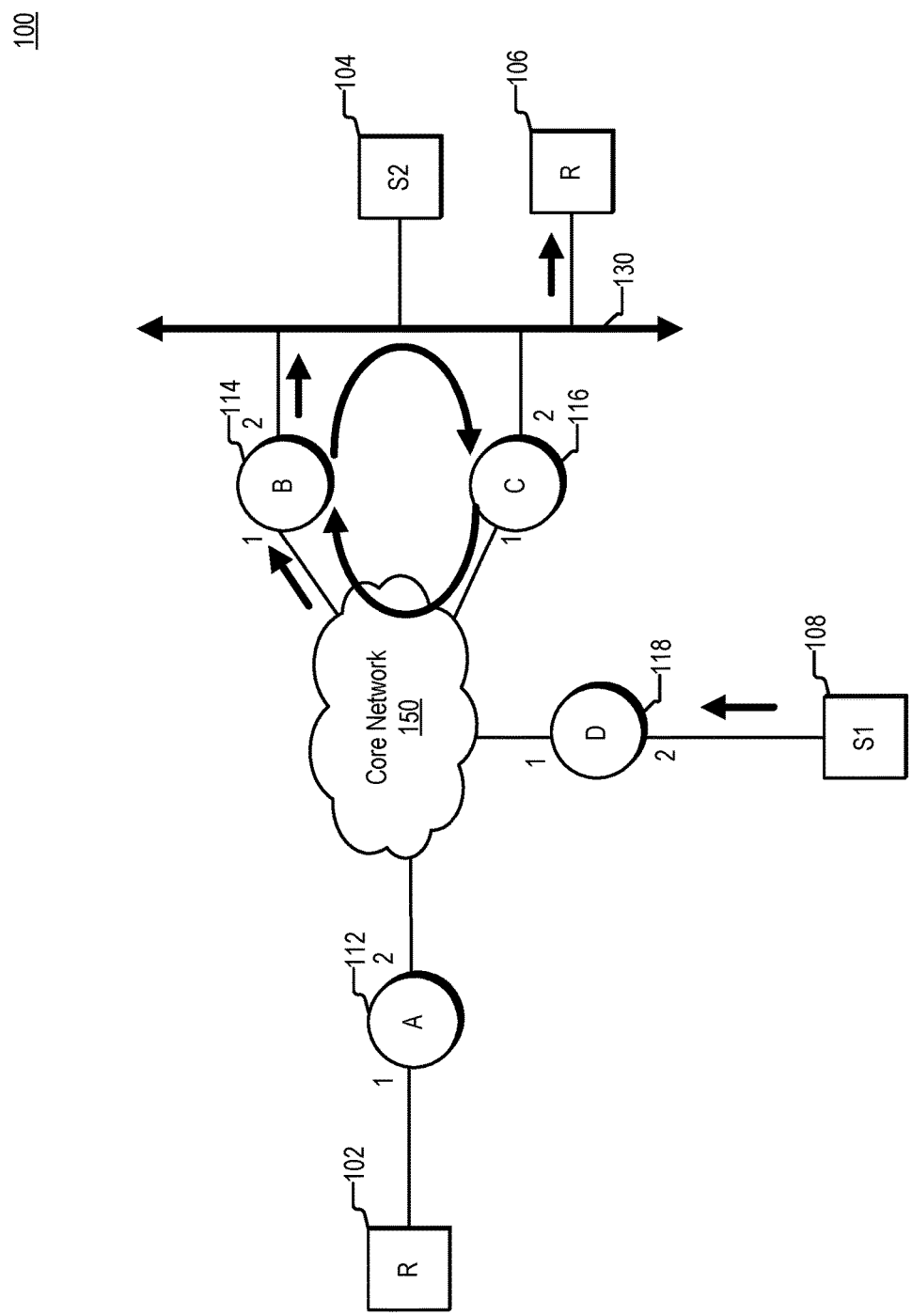
FIG. 3A is a simplified block diagram illustrating certain components of an example network.

FIG. 3A is a simplified block diagram of network 100, in which techniques to detect and prevent routing loops can be implemented. Like numbered elements of FIG. 3A correspond to those of FIG. 1A. In the example of FIG. 3A, node 114 is configured as a DF. Either or both of node 114 and node 116 can receive traffic, e.g., multicast data packets addressed to a group that receiver 106 has joined, from core network 150. Both node 114 and node 116 would forward the received traffic onto LAN 130, resulting in duplicate packets being received by receiver 106 and formation of a routing loop. For example, if node 114 forwards a packet received from core network 150 to LAN 130, in addition to receiver 106 receiving the packet, node 116 can pick up the packet and forward the packet to core network 150. If the nodes in core network 150 forward the packet to node 114, a loop occurs, as shown by the curved arrows in FIG. 3A. However, since node 116 is not configured as the DF, node 114 forwards the traffic onto LAN 130 and node 116 drops the traffic. That is, forwarding information on node 116 is configured such that traffic received on an interface coupled to LAN 130 (interface 2 in this example) by node 116 is dropped. Similarly, node 116 is configured to drop packets received on an interface coupled to core network 150 (interface 1 in this example).

Figure 3B:
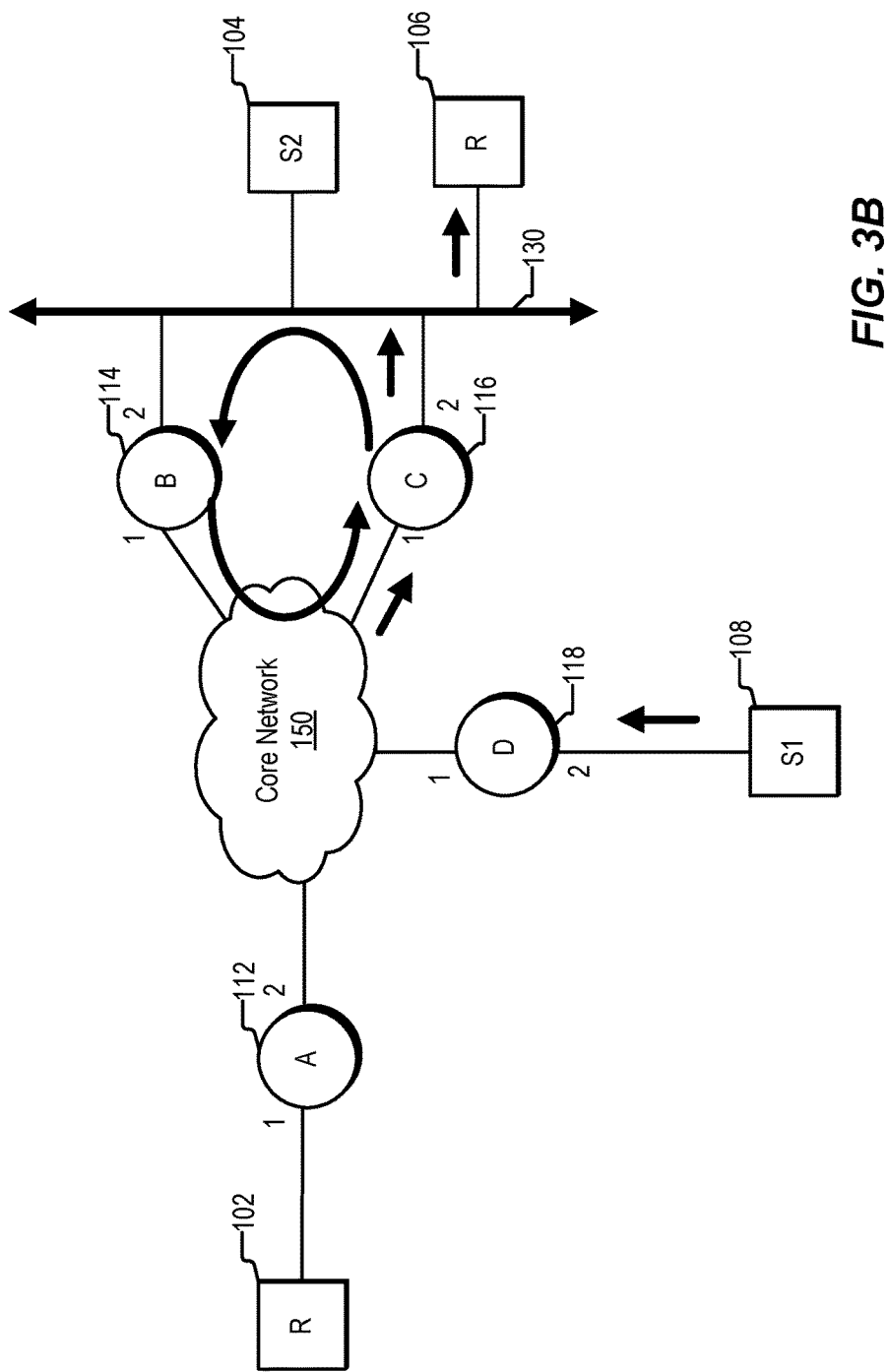
FIG. 3B is a simplified block diagram illustrating certain components of an example network.

FIG. 3B is a simplified block diagram of network 100, in which techniques to detect and prevent routing loops can be implemented. Like numbered elements of FIG. 3B correspond to those of FIG. 1A. In the example of FIG. 3B, node 116 is configured as a DF. Either or both of node 114 and node 116 receive traffic, e.g., multicast data packets addressed to a group that receiver 106 has joined, from core network 150. Both node 114 and node 116 would forward the received traffic onto LAN 130, resulting in duplicate packets being received by receiver 106 and formation of a routing loop. For example, if node 116 forwards a packet received from core network 150 onto LAN 130, in addition to receiver 106 receiving the packet, node 114 can pick up a copy of the packet from LAN 130, and forward the packet to core network 150. If the nodes in core network 150 forward the packet to node 116, a loop occurs, as shown by the curved arrows in FIG. 3B. However, since node 114 is not configured as the DF, node 116 forward the traffic onto LAN 130 and node 114 drops the traffic. That is, forwarding information on node 114 is configured such that traffic received on an interface coupled to LAN 130 (interface 2 in this example) by node 114 is dropped. Similarly, node 114 is configured to drop packets received on an interface coupled to core network 150 (interface 1 in this example).

Figure 4:
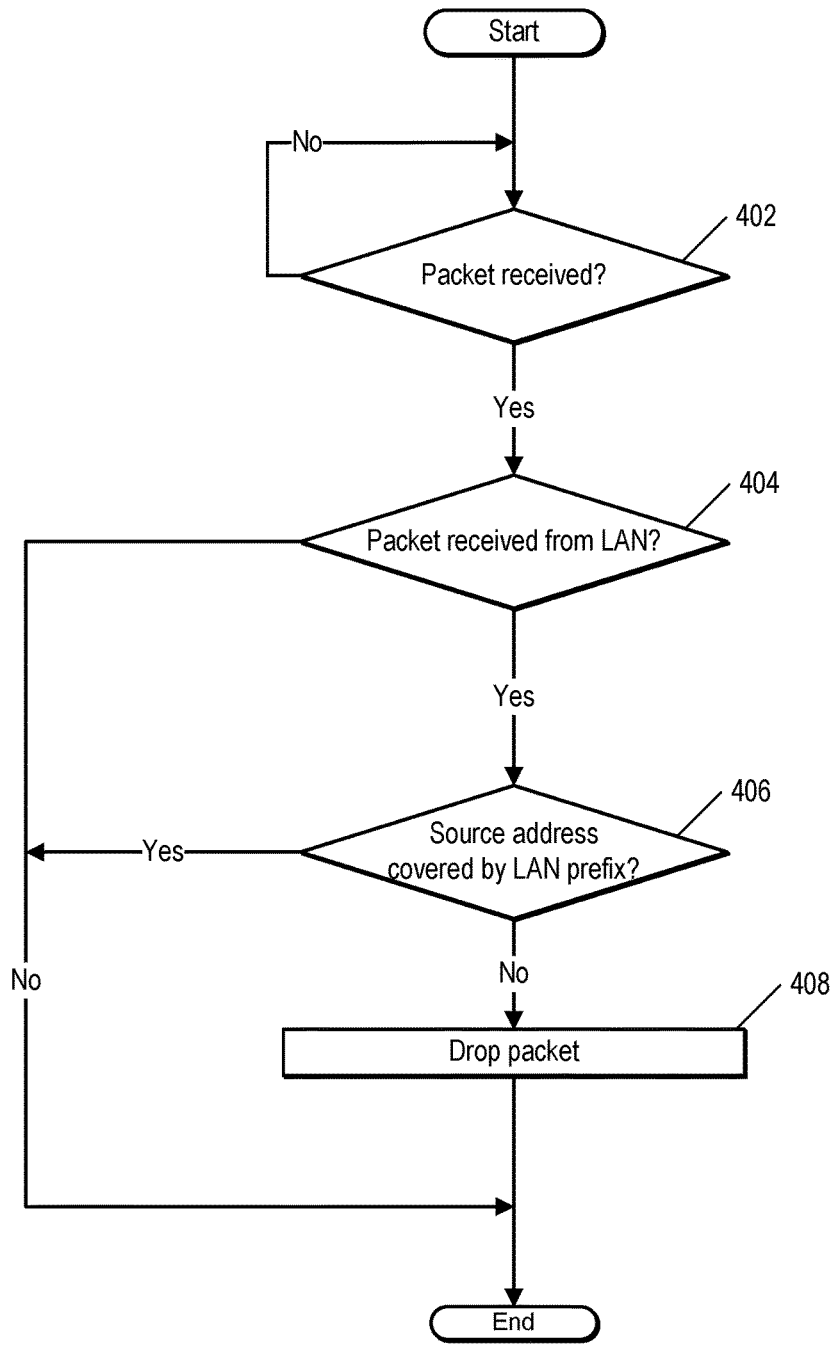
FIG. 4 is a flow chart illustrating an example process, according to the present description.

FIG. 4 shows an example method of detecting and preventing routing loops. In one embodiment, the method of FIG. 4 is performed by one or more nodes in a leaf network, such as nodes 114 and 116 of FIG. 1A, that are coupled to a terminal LAN, such as LAN 130 of FIG. 1A. The method shown in FIG. 4 can prevent routing loops of traffic being forwarded away from a core network, such as core network 150 of FIG. 1A, and towards one or more receivers, e.g., receivers coupled to the LAN. Such routing loops can result from multiple nodes concurrently acting as designated forwarder, e.g., due to an error with the designated forwarder election process. To prevent these loops, the node prevents packets from being improperly received from the LAN, which could lead to a loop of traffic being forwarded onto the LAN. Thus, though the method described with regard to FIG. 2 prevents loops relating to traffic traveling in the egress direction (onto the LAN, away from the core network), traffic travelling in the ingress direction (away from the LAN, towards the core network) is checked.

At 402, a node detects whether a packet has been received. If not, the node waits. In response to detecting that a packet is received, the node determines, at 404, the direction of travel of the packet. That is, the node determines whether the packet was received from the LAN. In one embodiment, this involves determining the interface by which the packet was received. In another embodiment, the node evaluates the source address on the packet. At 406, the node determines whether the source address of the packet is covered by the LAN prefix. To make this determination, the node compares the LAN's prefix with the corresponding bits in the source address of the packet. If all bits match, the source address of the packet is covered by LAN's prefix. If the source address of the packet is not covered by the LAN's prefix, the node infers that the packet was not sourced by a host coupled to the LAN, and the node drops the packet at 408. If the node determines that the source address of the packet is covered by the LAN's prefix, the node forwards the packet normally. In one embodiment, this involves encapsulating the packet with a BIER header and forwarding the packet into the core network.

Figure 5:
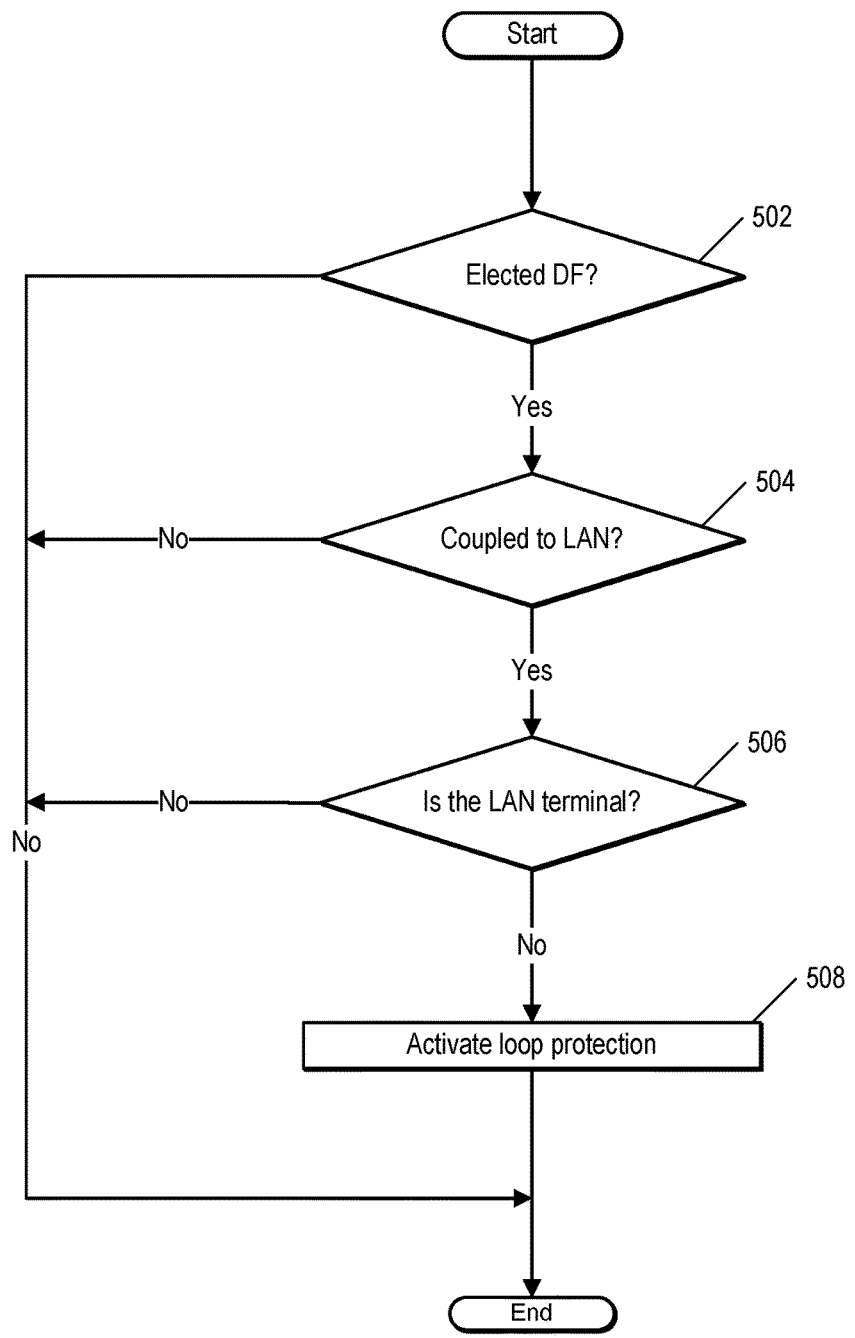
FIG. 5 is a flow chart illustrating an example process, according to the present description.

FIG. 5 shows an example method of configuring a node. The method shown in FIG. 5 can be used to determine whether to implement loop detection and prevention mechanisms, such as those described with regard to FIG. 2 and/or FIG. 4. In one embodiment, the method of FIG. 5 is performed by one or more nodes in a leaf network, such as nodes 114 and 116 of FIG. 1A, that are coupled to a terminal LAN, such as LAN 130 of FIG. 1A. The operations described with regard to FIG. 5 can be performed automatically by the node, e.g., in response to detecting an event, such as being booted or restarted, or manually, e.g., by an administrator.

At 502, the node determines whether or not the node has been elected designated forwarder. In one embodiment, the node participates in a designated forwarder election process. In another embodiment, the node participates in a designated router (DR) election process. DR election has the advantage to being more lightweight than DF elections. That is, the DR election utilizes less resources, and can generally be performed more quickly than a DF election. However, DR elections are often less robust, that is, DR elections are often more prone to errors than DF elections. Also, DRs are not typically used with bidirectional shared trees. While the present disclosure primarily refers to designated forwarder elections, the terminology used herein can also refer to DR election.

If the node determines that the node is a designated forwarder, the node determines, at 504, whether the node is coupled to a LAN. In one embodiment, this involves accessing forwarding information maintained by the node. In response to determining that the node is coupled to a LAN, the node determines whether the LAN is a terminal LAN, or whether there are other nodes coupled to the LAN. In one embodiment, the node accesses forwarding information, such as topology information, to make this determination. If the LAN is not a terminal LAN, the node cannot discard packets whose source address is not covered, as the packets could legitimately come from a node downstream from the LAN, and not from the core network in a loop.

In response to determining that the node is a designated forwarder and that the node is coupled to a terminal LAN, the node activates the loop prevention mechanisms described with regard to FIG. 2 and FIG. 4. In one embodiment, this involves updating configuration information stored in the node. Subsequent to activating the loop prevention mechanisms, packets received by the node are subject to additional checks, as described with regard to FIG. 2 and FIG. 4.

Figure 6:
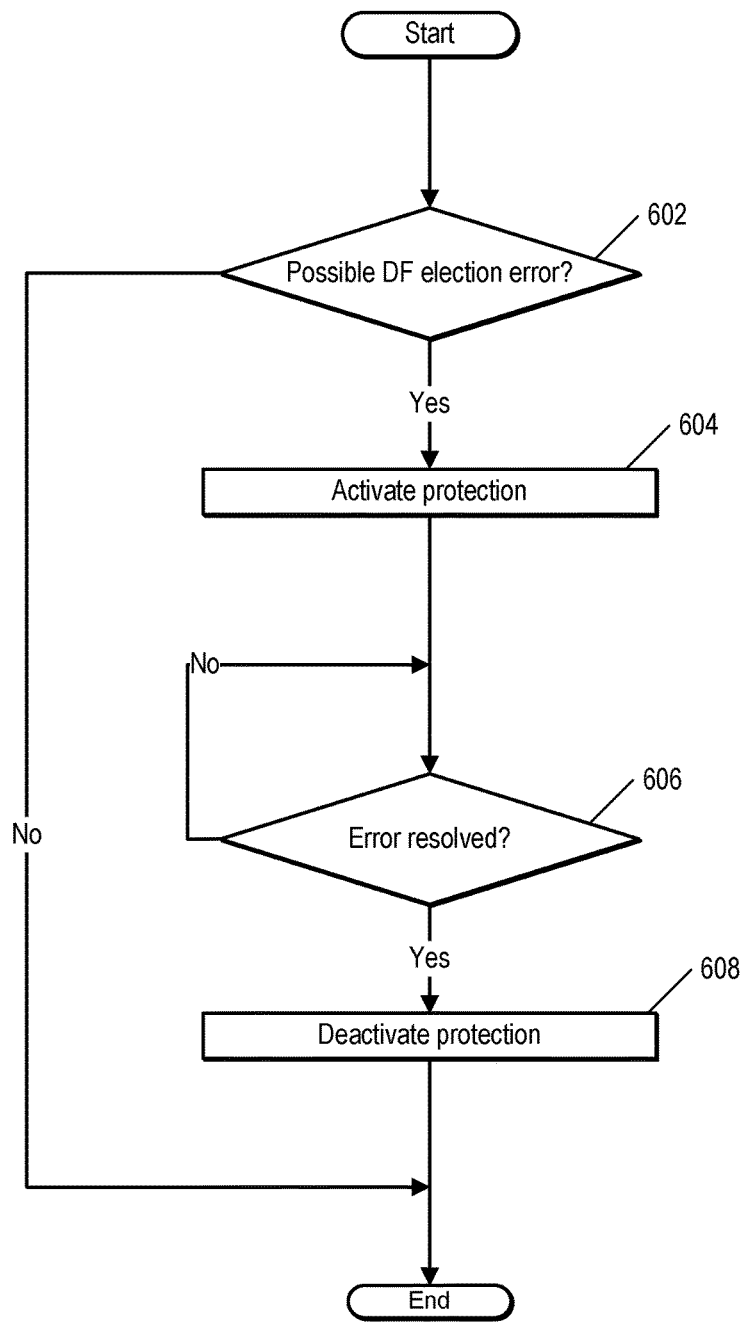
FIG. 6 is a flow chart illustrating an example process, according to the present description.

FIG. 6 shows an example method of configuring a node. The method shown in FIG. 6 can be used to determine whether to implement loop detection and prevention mechanisms, such as those described with regard to FIG. 2 and/or FIG. 4. In one embodiment, the method of FIG. 6 is performed by one or more nodes in a leaf network, such as nodes 114 and 116 of FIG. 1A, that are coupled to a LAN, such as LAN 130 of FIG. 1A. The operations described with regard to FIG. 6 can be performed automatically by the node, e.g., in response to detecting an event, such as being booted or restarted, or manually, e.g., by an administrator.

At 602, the node determines whether a possible designated forwarder election error exists. In one embodiment, the node detects some event or condition, such as receiving a packet from an unexpected interface, receiving an unexpected protocol message, failing to receive an expected protocol message, receipt of an error message, or any other occurrence that indicates that multiple nodes may concurrently be operating as designated forwarder. In response to detecting such a condition, the node activates loop protection, as described with regard to FIG. 2 and FIG. 4. In one embodiment, this involves updating configuration information stored in the node. Subsequent to activating the loop protection mechanisms, packets received by the node are subject to additional checks, as described with regard to FIG. 2 and FIG. 4. The node also, in one embodiment, initiates a designated forwarder election in an attempt to resolve the error.

At 606, the node determines whether the detected error or potential error has been resolved. For example, the node can receive an update indicating a new designated forwarder has been successfully elected. In response to detecting the resolution, the node deactivates, at 608, the loop protection. In one embodiment, this involves updating configuration information stored in the node. In one embodiment, the node deactivates the loop protection in response to determining that the node is not the designated forwarder or in response to to determining that the node is not coupled to a terminal LAN. For example, in response to a topology change, the LAN to which the node is connected may go from being a terminal LAN to a transit LAN. In response to such a topology change, the node deactivates the loop protection.

Figure 7:
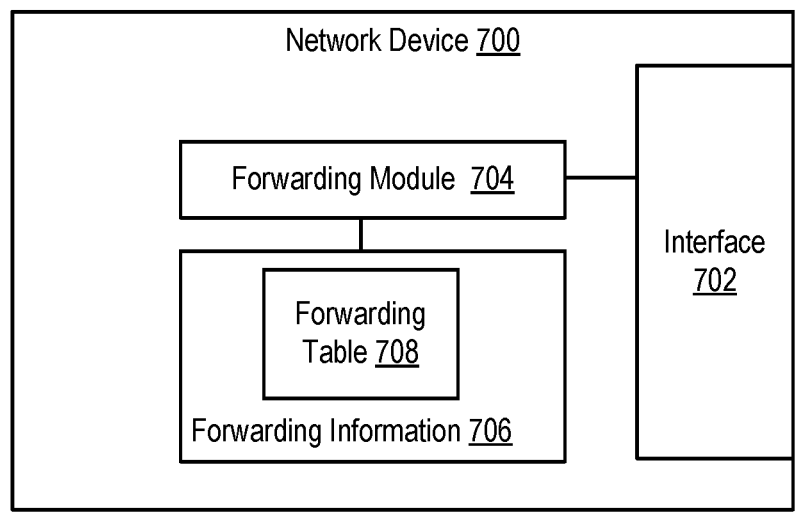
FIG. 7 is a block diagram illustrating certain components of an example node that can be employed in a network.

FIG. 7 is a block diagram illustrating certain components of a network device that can be associated with a node in one of the networks described herein. Network device 700 can, for example, be associated with a node in network 100 of FIG. 1A. In the embodiment of FIG. 7, network device 700 includes a forwarding module 704, forwarding information 706 and a communication interface 702. In one embodiment, communication interface 702 comprises multiple interfaces, and is configured both for sending and receiving messages within a network and for sending and receiving control information, either between network nodes or between the network device and a controller. Each interface may be a physical interface or a logical interface.

In the embodiment of FIG. 7, forwarding information 706 includes a FIB, or forwarding table 708. In an embodiment, forwarding table 708 is a multicast forwarding table. In the embodiment of FIG. 7, communication over interface 702 is handled via forwarding module 704. Forwarding module 704 is configured to forward messages using stored forwarding information 706. Forwarding information 706 is used by forwarding module 704.

Figure 8:
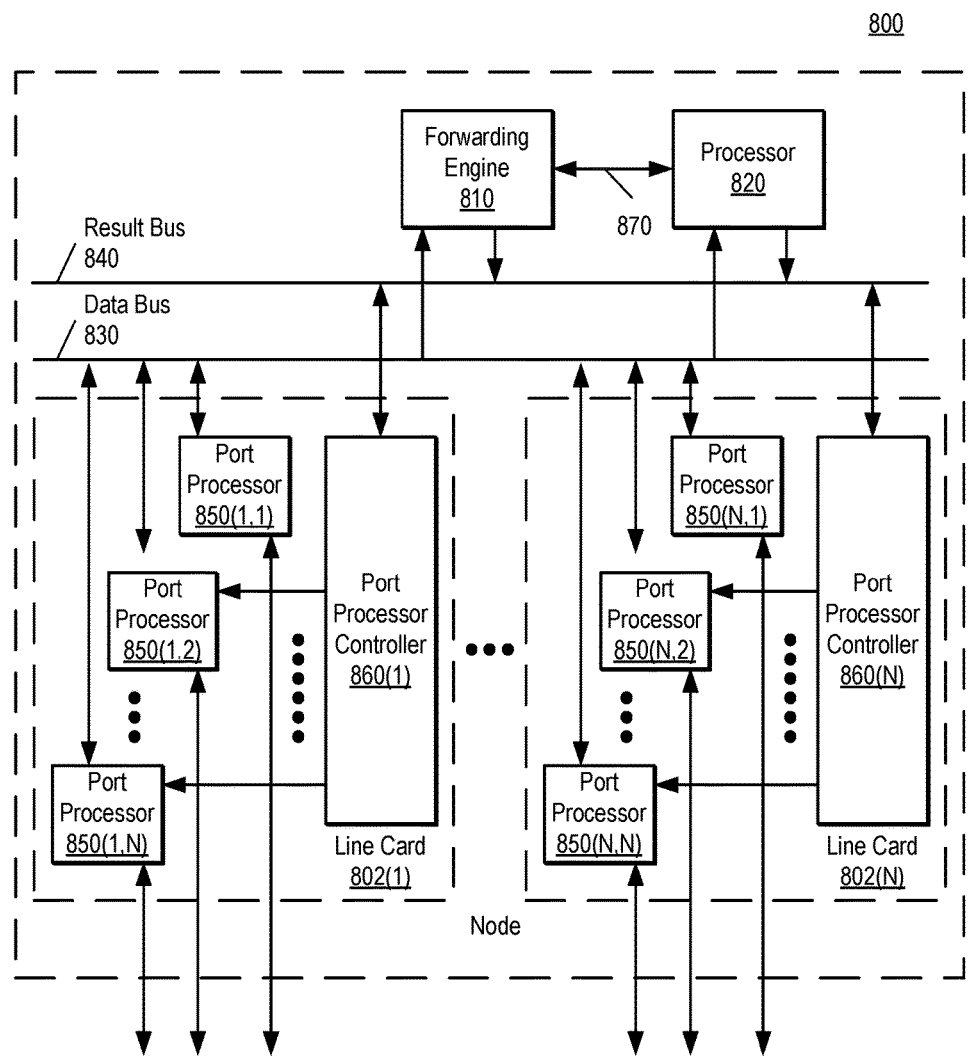
FIG. 8 is a block diagram depicting a computer system suitable for implementing embodiments of the systems described herein.

FIG. 8 is a block diagram illustrating certain additional and/or alternative components of nodes that can be employed in the networks described herein. In this depiction, node 800 includes a number of line cards (line cards 802(1)-(N)) that are communicatively coupled to a forwarding engine or packet forwarder 810 and a processor 820 via a data bus 830 and a result bus 840. Line cards 802(1)-(N) include a number of port processors 850(1, 1)-(N, N) which are controlled by port processor controllers 860(1)-(N). It will also be noted that forwarding engine 810 and processor 820 are not only coupled to one another via data bus 830 and result bus 840, but are also communicatively coupled to one another by a communications link 870.

The processors 850 and 860 of each line card 802 may be mounted on a single printed circuit board. When a packet or packet and header are received, the packet or packet and header may be identified and analyzed by router 800 in the following manner Upon receipt, a packet (or some or all of its control information) or packet and header is sent from the one of port processors 850(1, 1)-(N, N) at which the packet or packet and header was received to one or more of those devices coupled to data bus 830 (e.g., others of port processors 850(1, 1)-(N, N), forwarding engine 810 and/or processor 820). Handling of the packet or packet and header can be determined, for example, by forwarding engine 810. For example, forwarding engine 810 may determine that the packet or packet and header should be forwarded to one or more of port processors 850(1, 1)-(N, N). This can be accomplished by indicating to corresponding one(s) of port processor controllers 860(1)-(N) that the copy of the packet or packet and header held in the given one(s) of port processors 850(1,1)-(N,N) should be forwarded to the appropriate one of port processors 850(1,1)-(N,N). In addition, or alternatively, once a packet or packet and header has been identified for processing, forwarding engine 810, processor 820 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Figure 9:
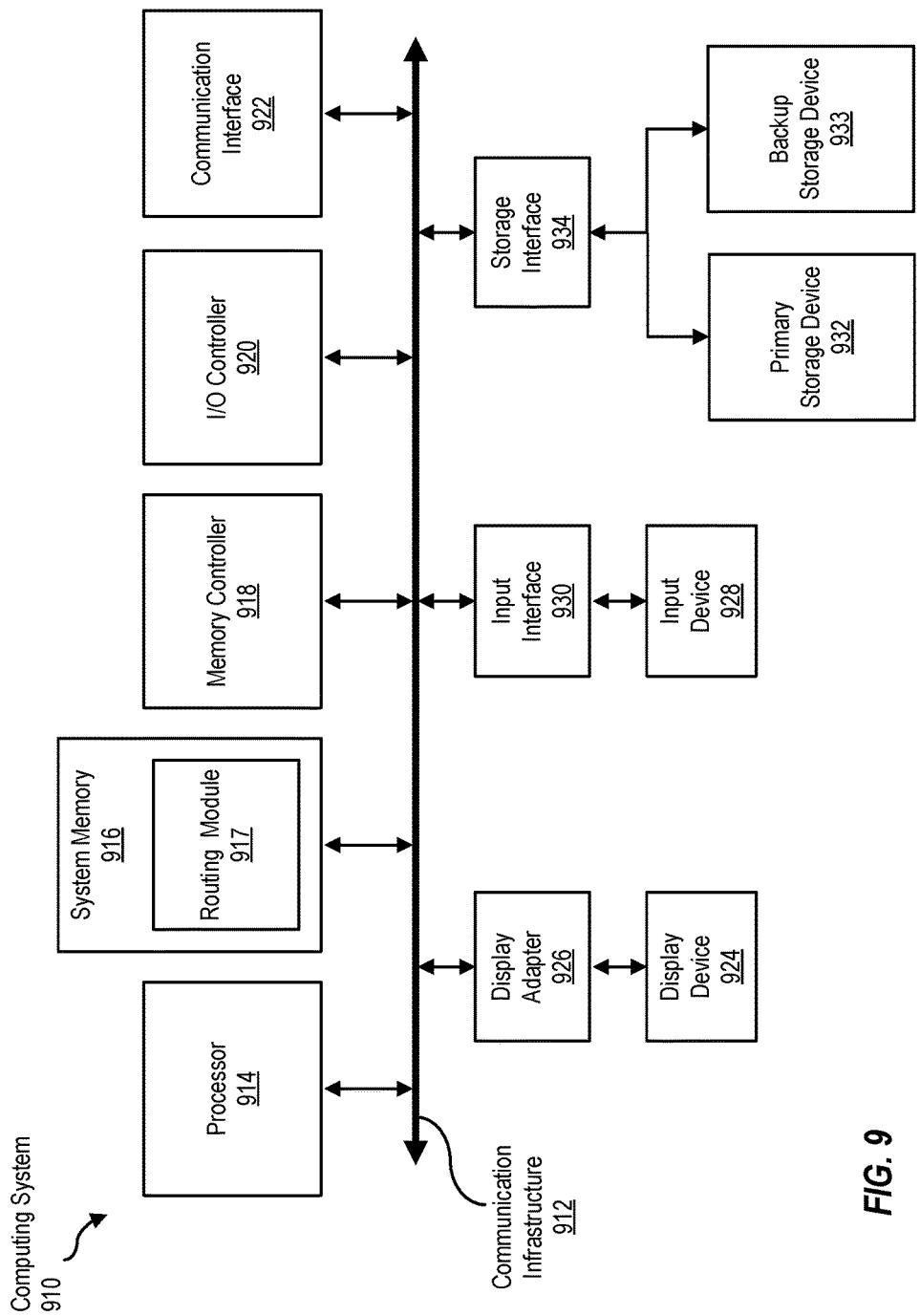
FIG. 9 is a block diagram depicting a network device suitable for implementing embodiments of the systems described herein.

FIG. 9 is a block diagram of a computing device, illustrating, for example, implementation of a forwarding module in software as described above. Computing system 910 broadly represents any single or multi-processor computing device or system capable of executing computer-readable instructions. Examples of computing system 910 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 910 may include at least one processor 914 and a system memory 916. By executing the software that implements a forwarding module 917, computing system 910 becomes a special purpose computing device that is configured to perform packet forwarding, in the manner described above.

Processor 914 generally represents any type or form of processing unit capable of processing data or interpreting and executing instructions. In certain embodiments, processor 914 may receive instructions from a software application or module. These instructions may cause processor 914 to perform the functions of one or more of the embodiments described and/or illustrated herein. For example, processor 914 may perform and/or be a means for performing the operations described herein. Processor 914 may also perform and/or be a means for performing any other operations, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, program instructions executable to implement a forwarding module configured to forward multicast data packets may be loaded into system memory 916.

In certain embodiments, computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller 918 may perform and/or be a means for performing, either alone or in combination with other elements, one or more of the operations or features described and/or illustrated herein.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel Examples of host adapters include, without limitation, Small Computer System Interface (SCSI) host adapters, Universal Serial Bus (USB) host adapters, Institute of Electrical and Electronics Engineers (IEEE) 9054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer) for display on display device 924.

As illustrated in FIG. 9, computing system 910 may also include at least one input device 928 coupled to communication infrastructure 912 via an input interface 930. Input device 928 generally represents any type or form of input device capable of providing input, either computer or human generated, to computing system 910. Examples of input device 928 include, without limitation, a keyboard, a pointing device, a speech recognition device, or any other input device.

As illustrated in FIG. 9, computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910. A storage device like primary storage device 932 can store information such as routing tables and forwarding tables.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9.

Computing system 910 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 910 for storage in memory via a network such as the Internet or upon a carrier medium.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the embodiments described and/or illustrated herein. Additionally or alternatively, one or more of the embodiments described and/or illustrated herein may be implemented in firmware and/or hardware. For example, computing system 910 may be configured as an application specific integrated circuit (ASIC) adapted to implement one or more of the embodiments disclosed herein.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a multicast data packet at a first node, wherein
the first node is coupled to a local area network (LAN),
an internet protocol (IP) prefix is assigned to the LAN, and
the multicast data packet comprises a source address; and
detecting, in response to the receiving, whether a loop exists, wherein
the detecting comprises determining whether the source address is covered by the IP prefix.

2. The method of claim 1, wherein
the first node is configured to act as a designated forwarder,
the multicast data packet is transmitted by a second node, wherein
the second node is coupled to the LAN, and
the second node is configured to act as the designated forwarder, and
the first node and the second node concurrently act as the designated forwarder.

3. The method of claim 1, further comprising:
preventing the multicast data packet from being forwarded onto the LAN, in response to determining that multicast data packet should be forwarded onto the LAN and that the source address is covered by the IP prefix.

4. The method of claim 1, further comprising:
dropping the multicast data packet, in response to determining that the multicast data packet was received from the LAN and that the source address is not covered by the IP prefix.

5. The method of claim 1, wherein
the LAN is a terminal LAN.

6. The method of claim 1, further comprising:
activating loop protection in response to determining that the LAN is a terminal LAN and that the first node is configured to act as a designated forwarder.

7. The method of claim 1, further comprising:
de-activating loop protection in response to determining that the LAN is a not a terminal LAN or that the first node is configured to act as a designated forwarder.

8. A system comprising:
a first node configured to
receive a multicast data packet, wherein
the first node is coupled to a local area network (LAN),
an internet protocol (IP) prefix is assigned to the LAN, and
the multicast data packet comprises a source address; and
detect, in response to receiving the multicast data packet, whether a loop exists, wherein
detecting whether a loop exists comprises determining whether the source address is covered by the IP prefix.

9. The system of claim 8, wherein
the first node is configured to act as a designated forwarder,
the multicast data packet is transmitted by a second node, wherein
the second node is coupled to the LAN, and
the second node is configured to act as the designated forwarder, and
the first node and the second node concurrently act as the designated forwarder.

10. The system of claim 8, wherein the first node is further configured to:
prevent the multicast data packet from being forwarded onto the LAN, in response to determining that multicast data packet should be forwarded onto the LAN and that the source address is covered by the IP prefix.

11. The system of claim 8, wherein the first node is further configured to:
drop the multicast data packet, in response to determining that the multicast data packet was received from the LAN and that the source address is not covered by the IP prefix.

12. The system of claim 8, wherein
the LAN is a terminal LAN.

13. The system of claim 8, wherein the first node is further configured to:
activate loop protection in response to determining that the LAN is a terminal LAN and that the first node is configured to act as a designated forwarder.

14. The system of claim 8, wherein the first node is further configured to:
de-activate loop protection in response to determining that the LAN is a not a terminal LAN or that the first node is configured to act as a designated forwarder.

15. A non-transitory computer readable storage medium comprising program instructions executable to:
receive a multicast data packet at a first node, wherein
the first node is coupled to a local area network (LAN),
an internet protocol (IP) prefix is assigned to the LAN, and
the multicast data packet comprises a source address; and
detect, in response to receiving the multicast data packet, whether a loop exists, wherein
detecting whether a loop exists comprises determining whether the source address is covered by the IP prefix.

16. The non-transitory computer readable storage medium of claim 15, wherein
the first node is configured to act as a designated forwarder,
the multicast data packet is transmitted by a second node, wherein
the second node is coupled to the LAN, and
the second node is configured to act as the designated forwarder, and
the first node and the second node concurrently act as the designated forwarder.

17. The non-transitory computer readable storage medium of claim 15, wherein the instruction are further executable to:
prevent the multicast data packet from being forwarded onto the LAN, in response to determining that multicast data packet should be forwarded onto the LAN and that the source address is covered by the IP prefix.

18. The non-transitory computer readable storage medium of claim 15, wherein the instruction are further executable to:
drop the multicast data packet, in response to determining that the multicast data packet was received from the LAN and that the source address is not covered by the IP prefix.

19. The non-transitory computer readable storage medium of claim 15, wherein the instruction are further executable to:
   activate loop protection in response to determining that the LAN is a terminal LAN and that the first node is configured to act as a designated forwarder.

20. The non-transitory computer readable storage medium of claim 15, wherein the instruction are further executable to:
   de-activate loop protection in response to determining that the LAN is a not a terminal LAN or that the first node is configured to act as a designated forwarder.

* * * * *